Patented Feb. 25, 1941

2,232,700

UNITED STATES PATENT OFFICE 2,232,700

VAT DYESTUFF

Maurice H. Fleysher, Buffalo, N. Y., assignor to National Aniline & Chemical Company, Inc., New York, N. Y., a corporation of New York No Drawing. Application April 12, 1938, Serial No. 201,491

3 Claims. (Cl. 260—316)

This invention relates to a new and useful vat dyestuff dyeing cotton gray to black shades. It relates more particularly to a vat dyestuff which is derived from a certain di-anthraquinonylimino-dibenzanthrone, namely, the di-(1-anthraquinonylimino)-dibenzanthrone resulting from the condensation of two molecular proportions of 1-aminoanthraquinone with one molecular proportion of the dibrom-dibenzanthrone which is obtained by brominating dibenzanthrone in chlorsulfonic acid with bromine in the presence of a small amount of a halogen carrier, such as sulfur or iodine.

According to the present invention a vat dyestuff dyeing cotton greenish-gray to reddish-gray to black shades which are fast to chlorine, light, washing and boiling alkali, is obtained by heating said di-(1-anthraquinonylimino)-dibenzanthrone with a condensing agent of the type usually employed for converting a dianthrimide to a carbazole compound.

The processes whereby said di-(1-anthraquinonylimino)-dibenzanthrone can be converted to the vat dye of this invention are illustrated by the following examples in which the parts are by weight and the temperatures are in degrees centigrade.

Example 1.—A mixture of 400 parts of caustic potash and 25 parts of water was agitated and heated to obtain a uniform liquid mass at a temperature between 230° and 240°. To this agitated mass, 30 parts of the di-(1-anthraquinonylimino)-dibenzanthrone were added and the mixture was agitated and maintained between 230° and 240° for about 1 hour. The fused mass was drowned in about 4000 parts of water, while the temperature of the aqueous drowned mass was not allowed to rise above 75°. The aqueous mixture was aerated between 50° and 75° to oxidize the leuco form of the fusion product therein to the desired product, and the whole mass was then made slightly acid by the addition of sulfuric acid. The precipitated dyestuff was separated as a cake by filtration of the aqueous acid mass, and was washed acid-free with water.

The product, when dried and ground, is a jet black powder which is insoluble in water. It dissolves in nitrobenzene to form a green solution which has a strong reddish fluorescence. Its solution in aniline is olive green. It dissolves in concentrated sulfuric acid to form a violet-black solution, which, upon addition thereto of a few drops of nitric acid, is converted to a clear green solution. From a hydrosulfite vat, which is violet-red, it dyes cotton excellent greenish-gray to black shades which are very fast to chlorine, light, washing, and boiling alkali.

Example 2.—A mixture of 290 parts of specially denatured alcohol (U. S. specially denatured alcohol Formula 2B) and 1120 parts of caustic potash was heated to about 160°, and to the agitated molten mass, 263 parts of the di-(1-anthraquinonylimino)-dibenzanthrone were added in small portions at frequent intervals over a period of about 2 hours. The mass was agitated at about 170° for an additional 1½ to 2 hours, after the last addition of dibenzanthrone compound was made. The resulting fusion mass was drowned in about 10,000 to about 11,000 parts of water and the aqueous mixture was treated thereafter in the manner described in Example 1.

The product of this example has the same physical and dyeing characteristics as the product of Example 1.

Example 3.—675 parts of anhydrous aluminum chloride and 225 parts of dry common salt were heated and agitated to form a uniform fused mass. To the resulting fused mixture maintained between 150° and 155°, 150 parts of the di-(1-anthraquinonylimino)-dibenzanthrone were added at frequent intervals and in small portions. The mixture was agitated and maintained between 150° and 155° for about one-half hour after the last addition of imino compound; then the reaction mass was transferred to about 7000 parts of cold water containing about 250 parts of 66° Bé. sulfuric acid. The aqueous mass was boiled until all lumpy material therein was completely disintegrated. The finely divided solid material was separated as a cake by filtration, and washed with water until it was free of acid. The cake was dried in an air oven. The dry dyestuff was dissolved in 10 times its weight of 66° Bé. sulfuric acid and the solution was drowned in water heated to about 60° and weighing about 3 times the weight of the dissolved dyestuff. The aqueous mass was diluted further with water, and the precipitated dyestuff was separated by filtration as a cake which was washed with water until it was free of acid.

The product, when dried and ground, is a jet-black powder which is insoluble in water. It is soluble in concentrated sulfuric acid to form a violet-black solution which assumes an olive shade when a few drops of nitric acid are added thereto. A solution of the product in nitrobenzene is dull violet and is characterized by a very strong reddish fluorescence. Its solution in aniline is dull red-violet. From vats which are reddish-blue, it dyes cotton excellent reddish-gray to black shades which are very fast to chlorine, light, and washing. It is well adapted for dyeing and printing by the usual methods.

The vat dye product of the present invention has the additional desirable property of forming mixtures with other vat dyes, whereby the shade of the resulting dyeings obtained with said product may be modified. Thus, it may be mixed with the orange dyestuff, dibrom pyranthrone; the khaki dyestuff, carbazolized 1,4,5,8-tetra-anthraquinonylimino-anthraquinone; and/or the brown dyestuff produced by carbazolizing the condensation product obtained from 1-benzoylamino-5-chloranthraquinone and 1-benzoylamino-4-chloranthraquinone, in various proportions to produce mixtures useful in the usual dyeing and printing processes to produce dyeings and prints varying from red-black to jet-black to green-black shades.

The filter-cakes resulting from the processes of the above examples can be admixed in the usual manner with dispersing agents, diluents, etc., and thus incorporated into vat dye pastes of standard strength, or then dried, ground and standardized in powder form.

It will be realized by those skilled in the art that the invention is not limited to the details of the above illustrative examples and that changes may be made without departing from the scope of the invention.

Thus the conditions and the manner of treatment may be varied, depending on the particular form in which the product is desired. If the black vat dye of the present invention is desired in the form producing dyeings having a greenish cast, the heating of the di-(1-anthraquinonylimino)-dibenzanthrone is preferably carried out with an alkaline condensing agent; whereas if the vat dye is desired in the form producing dyeings having a reddish cast, the heating of said di-(1-anthraquinonylimino)-dibenzanthrone is preferably carried out with an acid condensing agent. Presumably the color of the dyeings is influenced to some extent by the nature of by-products present in the final product, which differ somewhat among themselves depending on the specific conditions of the treatment. Instead of the condensing agents employed in the above examples, other condensing agents of the type usually employed for the conversion of a dianthrimide to a carbazole compound can be used, a number of which are known in the art; for example, sodium hydroxide, a mixture of sodium hydroxide and potassium hydroxide, sodium or potassium anilide and sodium or potassium amide.

The presence of sodium chloride in the fusion mixture in Example 3 is not essential but it is preferred inasmuch as it results in a lower fusion temperature, thereby resulting in a purer product than is obtained at higher temperatures. Instead of sodium chloride, other fluxing agents may be employed; such as antimony trichloride, pyridine, urea, etc.

The extent to which the heating is carried out will vary with the condensing agent and temperature employed, as is usual in condensation reactions of this type. For example, in the process of Example 2, formation of the desired product ordinarily will be found to be complete at 160° to 180° C. when the fusion mass is maintained at 160 to 180° C. for from 1 to 2½ hours after the addition of intermediates to the fusion mass.

The oxidation of the leuco compound present in the fusion mass resulting from the condensation in Examples 1 and 2 can be effected in various ways, as will be evident to those skilled in the art of making vat dyes.

The acid pasting of the product forming a part of the procedure of Example 3 may be omitted, although acid pasting is preferably carried out in view of the superior purity and form of the product resulting therefrom. Moreover, other methods of acid pasting known to the art may be employed; although the procedure involving partial dilution of the sulfuric acid solution of the dyestuff with warm water, followed by further dilution, as set out in Example 3, is preferred in view of the desirable physical form of the product resulting therefrom. If desired, the products resulting from the use of other condensing agents (as for example, the products of Examples 1 and 2), also may be subjected to an acid pasting procedure.

If desired, the product may be subjected to an oxidation after-treatment in an acid or alkaline medium, either before or after it has been acid pasted, as described in Example 3. Thus the wet cake of dyestuff may be suspended in water at about 50° to 60° C. and treated for about 1 hour, in the presence of weak alkali with small amounts of hydrogen peroxide or alkali-metal hypochlorites, perborates and persulfates, or in the presence of weak acid with small amounts of nitrites, alkali-metal chromates and bichromates, etc.

While the nature of the product of the present invention is not known, it is believed that the heat treatment with the condensing agent results in a condensation between the dibenzanthrone nucleus and the two anthraquinone nuclei of the di-(1-anthraquinonylimino)-dibenzanthrone, with elimination of 4 atoms of hydrogen and formation of heterocyclic nuclei including the imino nitrogen atoms, possibly of the carbazole type. The invention is not limited, however, to any theoretical explanations.

The nature of the di-(1-anthraquinonylimino)-dibenzanthrone employed as starting material for the production of the vat dyestuff of the present invention is an important factor in the production of a vat dye having the desirable properties of the product of the present invention, the di-(1-anthraquinonylimino)-dibenzanthrone employed in accordance with the present invention being that resulting from the condensation of two molecular proportions of 1-aminoanthraquinone with one molecular proportion of the dibrom-dibenzanthrone which results from the bromination of dibenzanthrone in chlorsulfonic acid with bromine in the presence of a small amount of a halogen carrier, such as sulfur or iodine. The reason for this fact is not definitely known but it is believed that the orientation of the bromine atoms with respect to the dibenzanthrone molecule as a result of the method of preparation, and the consequent orientation of the iminoanthraquinone radicals produced therefrom are important factors.

The method by which the said dibrom-dibenzanthrone is condensed with the 1-aminoanthraquinone for the production of the starting material of the process of the present invention is not limited to any specific conditions other than those known to the art for the preparation of said product. In general, it involves heating at least two molecular proportions of 1-aminoanthraquinone with one molecular proportion of said dibrom-dibenzanthrone in a suitable solvent (for example, nitrobenzene or naphthalene) in the presence of an acid binding agent (for example, sodium carbonate) and of an amination catalyst (for example, copper carbonate).

I claim:

1. A vat dyestuff prepared by heating with a condensing agent adapted to convert a dianthrimide to a carbazole compound the di-anthraquinonylimino dibenzanthrone resulting from the condensation of two mols of alpha-amino-anthraquinone with one mol of the dibrom dibenzanthrone prepared by brominating dibenzanthrone in chlorsulfonic acid in the presence of a halogen carrier, said dyestuff being in the dry, ground form a black powder insoluble in water, soluble in concentrated sulfuric acid to form a violet-black solution, soluble in nitrobenzene and aniline, and dyeing cotton from a hydrosulfite vat gray to black shades which are fast to chlorine, light, washing and boiling alkali.

2. A dibenzanthrone vat dyestuff which in the dry, ground form is a black powder, giving in nitrobenzene a green solution with strong reddish fluorescence, in aniline an olive green solution, in concentrated sulfuric acid a violet-black solution which on adding a few drops of nitric acid turns clear green, dyeing cotton fast greenish-gray to black shades from a violet-red vat and resulting from a caustic alkali fusion of the di-anthraquinonylimino dibenzanthrone obtained by brominating dibenzanthrone in chlorsulfonic acid in the presence of a halogen carrier and condensing the resultant dibrom dibenzanthrone with two mols of alpha-amino-anthraquinone for each mol of dibrom-dibenzanthrone.

3. A dibenzanthrone vat dyestuff which in the dry, ground form is a black powder, giving in nitrobenzene a dull violet solution with strong reddish fluorescence, in aniline a dull reddish-violet solution in concentrated sulfuric acid a violet-black solution which assumes an olive shade on addition of a few drops of nitric acid, dyeing cotton fast reddish-gray to black shades from a reddish-blue vat and resulting from an aluminum chloride fusion of the di-anthraquinonylimino dibenzanthrone obtained by brominating dibenzanthrone in chlorsulfonic acid in the presence of a halogen carrier and condensing the resultant dibrom-dibenzanthrone with two mols of alpha-aminoanthraquinone for each mol of dibrom dibenzanthrone.

MAURICE H. FLEYSHER.